United States Patent Office 3,574,756
Patented Apr. 13, 1971

3,574,756
METHOD OF PREPARING ORGANIC NITRO COMPOUNDS
Desmond Sheehan, 13a Wakefield St., Hamden, Conn. 06517, and Anthony F. Vellturo, 977 Ott Drive, Cheshire, Conn. 06410
No Drawing. Continuation-in-part of application Ser. No. 585,258, Oct. 10, 1966. This application Aug. 15, 1967, Ser. No. 664,232
Int. Cl. C07c *45/18, 49/26, 79/46*
U.S. Cl. 260—586         6 Claims

ABSTRACT OF THE DISCLOSURE

A method of preparing cyclic nitroketones which comprises gradually adding acetyl nitrate to the enol acetate of the unnitrated cyclic ketone, whereby the amount of acetyl nitrate is kept at less than excess, based on the enol acetate of the ketone, in the reaction mixture over substantially the time required for the reaction to occur.

RELATED APPLICATIONS

This application is a continuation-in-part of U.S. applications Ser. Nos. 585,258, filed Oct. 10, 1966, and 613,726, filed Feb. 3, 1967, both applications being now abandoned.

SUMMARY OF THE INVENTION

This invention relates to improved methods of preparing nitroketones and nitroacetates.

Applicants have discovered in particular that their improved method has more than doubled the yield of nitroketones obtainable utilizing prior art methods. In the case of 2-nitro-cyclohexanone, using applicants' methods, 95% yields of said compound have been obtained, whereas using the methods of the prior art as disclosed in one of the examples set forth herein, a yield of only 24% was obtained. The overall reactions, according to this invention, are shown in equations below:

(1)
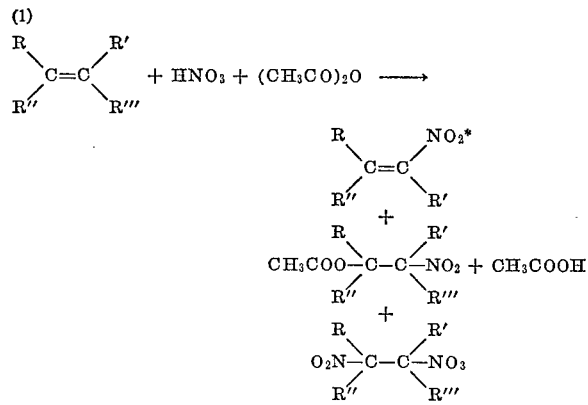

* The nitro olefin product will arise only when R''' is H.

(2)
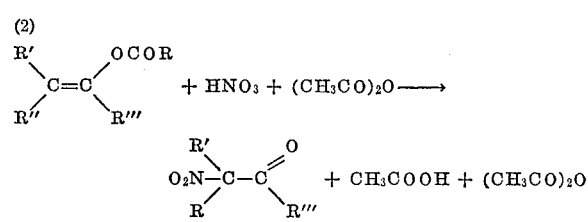

(3)
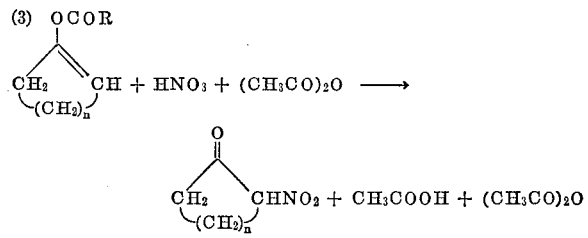

The radicals, R, R', R'' and R''' may be hydrogen, aliphatic, aralkyl or aromatic substituent groups such as methyl, ethyl, propyl, isopropyl, butyl, sec-butyl, iso-amyl, phenyl, p-methylbenzyl, o-ethylbenzyl and the like and where $n$ is a number from 0 to 20. In the Equations 2 and 3 R may be any hydrocarbon radical but is preferably methyl, giving rise to the byproducts shown. In Equation 1 R and R' may be a polymethylene chain or branched chain as in the case of cycloalkene. Similarly, in Equation 3 the polymethylene chain may be branched, as in the case of trimethyl cyclohexanone enol acetates as described below.

The products of the above reactions have broad utility. Not the least important is the use described in co-pending patent application Ser. No. 585,258, filed Oct. 10, 1966, of which this case is a continuation in part, wherein the enol acetate of cyclohexanone is nitrated to give 2-nitrocyclohexanone which is subsequently converted to caprolactam, a monomer for the production of nylon-6. Similarly, by the nitration of the enol acetate of 3,3,5-trimethyl cyclohexanone (the latter ketone is readily available by reduction of isophorone produced commercially from acetone) two hitherto unknown isomeric nitroketones are formed; i.e., 2-nitro-3,3,5-trimethyl cyclohexanone and 2 - nitro - 3,5,5 - trimethyl cyclohexanone. These ketones also can be converted to isomeric trimethyl caprolactams and hence methylated nylon-6 polymers. Other cyclic nitro ketones can similarly be converted to the related nylons 4, 5, 7, 8, 10, 12, etc.

The open-chain enol acetates afford α-nitroketones which can be cleaved readily in base to afford high purity nitroalkanes which are useful solvents and plasticizers and can in turn be readily reduced to presently useful amines.

The mixed products derived from simple substituted olefins can be converted to nitro-olefin products (c.f., Bordwell and Garbisch, J. Am. Chem. Soc., 82, 3588, 1960) which, apart from their inherent utility, can be hydrogenated successively to saturated nitro compounds and the corresponding amines. The utility of these procedures, particularly in the area of monomer synthesis, is readily apparent.

To define the advantages of our process more explicitly, consider the case of 2-nitrocycloalkanones.

Reference to cyclic α-nitroketones are surprisingly scarce in the literature. Thus, even in the apparently simple case of 2-nitrocyclohexanone only two references occur. Wieland, Garbisch and Chavan (Ann., 461, 295, 1928) prepared the compound in low yield by base-catalyzed condensation of an alkyl nitrate with cyclohexanone. More recently, Griswold and Starcher (J. Org. Chem., 31, 357, 1966) prepared the compound in 40% yield by the addition of cyclohexen-1-ol acetate to a solution of acetyl nitrate in acetic anhydride at —20° C. The acetyl nitrate (a hazardous, unstable explosive) is prepared in a prior step by the addition of colorless 70% nitric acid to acetic anhydride. Some evidence for the generality of this type of nitration can be seen in the work of Bachman and Hokama (J. Org. Chem., 25, 178, 1970) who added open-chain enol acetates (e.g., the enol acetates of 2-butanone and propiophenone) to solutions of acetyl nitrate in acetic anhydride to obtain open-chain α-nitroketones (e.g., methyl α-nitroethyl ketone and α-nitropropiophenone) although in very low yields (13% and 20% in the two instances cited above).

The instant invention has advantages in that it eliminates the necessity of preparing the explosive acetyl nitrate in quantity prior to the nitration step; it is not necessary to purify the nitric acid to a colorless state; and substantially more concentrated nitric acid solutions may be used (e.g., 90%), thus reducing the conversion of acetic anhydride to acetic acid by water to a minimum. Additionally, the yields of the instant method are very substantially improved (80–100%), and the reaction may be conducted at room temperature.

In the case of the simple substituted alkenes (as opposed to the enol acetates above) the product mixture is more complex. Bordwell and co-workers (e.g., J. Am. Chem. Soc., 82, 3588, 1960) have studied the olefin nitration mechanistically at some length but, like the previous references cited, added the olefin to a pre-prepared solution of acetyl nitrate in acetic anhydride.

In accordance with this invention, nitroketones, nitrocyclic ketones, nitroacetates, etc., are prepared by the preferably controlled direct addition of nitric acid (preferably concentrated) to a solution of olefin in acetic anhydride or, in addition, by adding acetyl nitrate to a solution of olefin in acetic anhydride. By the addition of compounds in the sequence of steps as noted above, substantial increased yields were obtained in contrast to the prior art. The addition of nitric acid to acetic anhydride produces acetyl nitrate which then reacts with the olefin. It should be noted that in this improved process, the molar ratio of acetyl nitrate to olefin does not exceed 1 until substantially the entire reaction has taken place, whereas in the prior art an excess of acetyl nitrate was always present throughout the entire reaction. Applicants have shown that the existence of an excess of acetyl nitrate during the entire reaction gave the lower yields obtained by the prior art.

It has been found that the procedure of this invention, which comprises adding nitric acid to the solution of olefin in acetic anhydride is preferably carried on at temperatures from about 10° to less than about 60° C. It has also been found that the process of this invention, which comprises adding acetyl nitrate to a solution of olefin in acetic anhydride is preferably carried on at a temperature from about −10° to about less than 60° C.

The following examples illustrate the method and its obvious advantages. (All temperatures given below are in degrees centigrade.)

EXAMPLE 1

Nitric acid (70% strength, 12.6 ml., 0.2 mole) was added dropwise to a well-stirred solution of cyclohexen-1-ol acetate (28.0 g., 0.2 mole) in acetic anhydride (61.0 g., 0.6 mole). The temperature of the solution was maintained at 18–20° by ice-bath cooling. When the addition was complete, the mixture was stirred for 15 min. at approximately 20°. Distillation at reduced pressure (10–40 mm.) removed volatile materials and allowed recovery of acetic acid and unreacted acetic anhydride. The residual pale-yellow oil weighed 28.0 g. (crude yield 98%) and infrared analysis indicated that the oil contained approximately 95% of the required 2-nitrocyclohexanone.

EXAMPLE 2

Again at 18–20°, 5.0 ml. of 90% nitric acid (0.1 mole) was added to 20 g. of acetic anhydride and then to a well-stirred solution of 14.0 g. of cyclohexen-1-ol acetate (0.1 mole) in 21.0 g. of acetic anhydride and the mixture stirred for 15 min. at approximately 20°. The volatile materials and solvent were removed, as in Example 1, to afford 14.3 g. of oil (quantitative crude yield) which infrared analysis showed was 95% 2-nitrocyclohexanone.

EXAMPLE 3

Following the procedure of the previous examples, the reaction product from 25 g. of cyclododecen-1-yl acetate (0.11 mole) in 102 g. of acetic anhydride (1.0 mole) and 7 ml. of 70% nitric acid (0.11 mole) was 27.1 g. of a solid (0.12 mole of theoretical product) M.P. 65–70°. After crystallization from methanol, the compound 2-nitrocyclododecanone produced exhibited M.P. 77–77.5° and was analytically pure.

EXAMPLE 4

Using similar reaction conditions to those of previous examples, 7.0 ml. of 70% nitric acid (0.11 mole) was added to 16.2 g. of acetophenone enol acetate (0.1 mole) in 41 g. of acetic anhydride (0.4 mole). After stirring at 15–25° for 15 min. the solution was poured into 200 ml. of ice-water when a solid product crystallized. Filtration and drying afforded 14.8 g. of white solid (90% yield) M.P. 94–99°. Recrystallization from benzene gave material M.P. 104–105°, which was pure α-nitroacetophenone.

EXAMPLE 5

A solution of 10.0 g. of isopropenyl acetate (0.1 mole) in 41.0 g. of acetic anhydride was treated with 7.0 ml. of 70% nitric acid (0.11 mole) under the usual conditions. After removal of volatile materials, 8.0 g. of residual oil was obtained and shown by infrared analysis to be 90% nitroacetone.

EXAMPLE 6

At 15–20°, 24.8 ml. of 70% nitric acid (0.39 mole) was added to a solution of 24.6 g. of cyclohexene (0.3 mole) in 180 ml. of acetic anhydride. The volatile components were removed in vacuo and the products distilled to afford 13.7 g. of 3-nitrocyclohexene (36%), 8.6 g. of 2-nitrocyclohexyl/nitrate (15%) and 17.6 g. of 2-nitrocyclohexyl acetate (31.4%). The corresponding yields by the published procedure, mentioned above, are 34, 10 and 21, respectively.

EXAMPLE 7

As in Example 6, 24.8 ml. of 70% nitric acid was added to 20.4 g. of cyclopentene (0.3 mole) in 180 ml. of acetic anhydride at 15–20°. Subsequent distillation afforded 14% of 3-nitrocyclopentene, 12% of 2-nitrocyclopentyl nitrate and 37% of 2-nitrocyclohexyl acetate (Bordwell and co-workers report yields of 19%, 8% and 20%, respectively).

EXAMPLE 8

Using the same method and molar ratios as in Examples 6 and 7, but using isobutylene as the olefin, the product yields were 60% α-nitro-t-butyl acetate and 5.3% α-nitro-t-butyl nitrate.

EXAMPLE 9

Colorless 70% nitric acid (6.4 ml., 0.1 mole) was added dropwise to a stirred and cooled solution (15°) of 10.0 g. cyclododecanone enol acetate (0.045 mole) in 100 ml. of acetic anhydride. The addition and cooling rates were adjusted to maintain a temperature of 18–20° in the reaction mixture. On completion of the addition (ca., 15 min.) the solution was stirred for 5 min. and poured into 100 ml. of ice water. A precipitate formed rapidly and was filtered and dried to afford 7.2 g. of a 2-nitro cyclododecanone M.P. 68–70°. A recrystallized analytical sample had M.P. 77.5–78°.

EXAMPLE 10

Controlling the temperature as in Example 9, 9.5 ml. colorless nitric acid (0.15 mole) was added to a solution of 10.5 g. of the enol acetate of cyclohexanone (0.075 mole) in 100 ml. of acetic anhydride. After completion of the addition, the mixture was stirred 5 min. and then poured into 100 ml. of ice water. Sodium chloride was added to saturate the solution which was then extracted with an organic solvent, such as diethyl ether. The other layer was separated, dried over magnesium sulfate, filtered and evaporated to afford an oil contaminated with acetic acid. The acid was removed in vacuo over sodium hydroxide and the resulting oil crystallized from methanol to afford 6.0 g. of 2-nitrocyclohexanone M.P. 35–38°.

EXAMPLE 11

A solution containing 0.14 mole of acetyl nitrate was prepared by adding 9.0 ml. of 70% nitric acid to 40 ml. of acetic anhydride while keeping the reaction temperature between 15–20°. This solution was then added dropwise to a stirred and cooled mixture containing 25.0 g. cyclododecanone enol acetate (0.11 mole) and 60 ml. of acetic anhydride maintained at 15–20°. On completion of the addition (ca., 40 min.) the solution was stirred for 20 min. and the volatiles were removed first at 50°/10–15 mm., then at 50°/1–0.5 mm. The resulting solid residue was extracted with 30–60° petroleum ether and filtered to give 19.0 g. of 2-nitrocyclododecanone, M.P. 73–77°. The petroleum ether filtrate was evaporated and yielded 5.2 gms. of an oil which was shown by gas chromatographic analysis to be mostly cyclododecanone. This result constitutes a quantitative yield at 76% conversion.

EXAMPLE 12

182 parts (1 mole) of the mixed isomers 3,3,5-trimethyl and 3,5,5 - trimethyl cyclohexanone enol acetates (alternative nomenclature - 1 - acetoxy - 3,3,5 - trimethyl cyclohexene and 1-acetoxy - 3,5,5 - trimethyl cyclohexene) were dissolved in 300 ml. of acetic anhydride and then treated dropwise with concentrated nitric acid (63.5 ml., 70%, 1.0 mole) while the reaction mixture was maintained at 15–20°. When the addition was complete (45 min.), the mixture was stirred for 30 min., and the volatile components removed at reduced pressure (25 mm.–1.0 mm. at room temperature). The golden yellow residue represented an essentially quantitative yield of the mixed isomers, hitherto unknown, 2-nitro-3,3,5-trimethyl cyclohexanone and 2-nitro-3,5,5-trimethyl cyclohexanone.

EXAMPLE 13

126 parts of cyclopentanone enol acetate (1 mole) were dissolved in 300 ml. of acetic anhydride and the mixture maintained at 15–20° during the addition of 63.5 ml. of 70% nitric acid (1 mole). After the addition (60 min.) the mixture was stirred one hour and the volatiles removed at reduced pressure to leave an orange oil—119 parts (92% of theory) of 2-nitro cyclopentanone.

EXAMPLE 14

Prior art

Acetylnitrate (0.23 mole) was prepared by adding 14.5 ml., 70% nitric acid to 320 ml. of acetic anhydride while keeping the reaction temperature at 18–20°. The solution was then cooled to −20° and 21 g. (.15 ml.) of cyclohexanone enol acetate was added as rapidly as possible. A slight increase in temperature (5°) was noted and the reaction mixture was stirred and held at −10° to −8° for 15 min. before being poured into 500 ml. of ice water. After stirring for 1 hr., 600 ml. of saturated sodium chloride was added and the resulting solution extracted with three 100 ml. portions of diethyl ether. The ether was washed free of acetic acid and then dried with magnesium sulfate. Evaporation gave 10.5 gms. of an oil containing 2-nitrocyclohexanone which was then crystallized from methanol at −60°. The resultant yield was 8.0 gms., 24%, M.P. 34–37°.

As can be seen from the above examples the enol acetate of the cyclic ketone used as the starting material can be of the formula

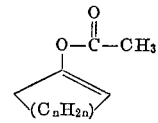

wherein $n$ is an integer of 2 to 9.

We claim:
1. A method of preparing cyclic nitroketones which comprises gradually adding acetyl nitrate to the enol acetate of a cyclic ketone having the formula:

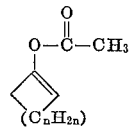

wherein $n$ is an integer from 2 to 9, the enol acetate of the cyclic ketone being in solution in a molar excess of acetic anhydride, at a temperature from about −10° C. to about less than 60° C., whereby the acetyl nitrate is maintained in less than molar excess, based on the enol acetate of the cyclic ketone, until substantially all of the enol acetate of the cyclic ketone has been converted into the nitroketone.

2. A method according to claim 1 in which the acetyl nitrate is formed in situ by the gradual addition of nitric acid of at least 70% strength to the solution of the enol acetate of the cyclic ketone in an excess of acetic anhydride, the excess being sufficient so that there is always an excess of acetic anhydride in the reaction mixture during the reaction.

3. A method according to claim 2 in which $n$ is 3.
4. A method according to claim 1 in which $n$ is 3.
5. A method according to claim 1 in which $n$ is 2.
6. A method according to claim 1 in which $n$ is 9.

References Cited

UNITED STATES PATENTS

Beilstein: Organische Chemie, Band VII, III Supplement, pp. 66, 68, 124 and 125.

Griswold et al.: Journal of Organic Chemistry, 31(2) [1966], pp. 357–361, QD241.J6.

BERNARD HELFIN, Primary Examiner

N. P. MORGENSTERN, Assistant Examiner

U.S. Cl. X.R.

260—488, 590, 595, 476, 497, 239.3, 78